United States Patent
Kuan

(10) Patent No.: US 11,017,082 B1
(45) Date of Patent: May 25, 2021

(54) METHOD FOR SESSION WORKFLOW INFORMATION FLOW ANALYSIS

(71) Applicant: HRL Laboratories, LLC, Malibu, CA (US)

(72) Inventor: George Kuan, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 205 days.

(21) Appl. No.: 15/673,101

(22) Filed: Aug. 9, 2017

Related U.S. Application Data

(60) Provisional application No. 62/403,811, filed on Oct. 4, 2016.

(51) Int. Cl.
  *G06F 21/56* (2013.01)
  *G06F 21/62* (2013.01)

(52) U.S. Cl.
  CPC ........ *G06F 21/562* (2013.01); *G06F 21/6218* (2013.01); *G06F 2221/034* (2013.01)

(58) Field of Classification Search
  CPC .................................................. G06F 21/562
  USPC .......................................................... 726/23
  See application file for complete search history.

(56) References Cited

U.S. PATENT DOCUMENTS

| | | | | |
|---|---|---|---|---|
| 7,873,734 | B1* | 1/2011 | Eidelman | H04L 67/142 709/203 |
| 9,491,157 | B1* | 11/2016 | Amdahl | H04L 63/08 |
| 9,565,210 | B2* | 2/2017 | Hsiung | H04L 63/1466 |
| 2004/0105431 | A1* | 6/2004 | Monjas-Llorente | H04L 63/08 370/352 |
| 2006/0277596 | A1* | 12/2006 | Calvert | H04L 63/0218 726/3 |
| 2011/0197277 | A1* | 8/2011 | Figlin | G06F 21/577 726/23 |
| 2018/0075231 | A1* | 3/2018 | Subramanian | G06F 21/41 |

OTHER PUBLICATIONS

Chetan Bansal, Karthikeyan Bhargavan, and Sergio Maffeis. Discovering concrete attacks on website authorization by formal analysis. In 2012 IEEE 25th Computer Security Foundations Symposium (CSF), Jun. 2012, pp. 247-262.

D. Hardt. The OAuth 2.0 authorization framework draft-ietf-oauth-v2-31. Technical report, Jul. 2012, pp. 1-72. h t t p : / / tools.ietf.org/html/draft-ietf.oauth-v2-31, taken on Aug. 4, 2014.

Naoki Kobayashi. Type-based information flow analysis for the pi-calculus. Acta Inf., 42(4-5): pp. 291-347, 2005.

(Continued)

*Primary Examiner* — Dant B Shaifer Harriman
(74) *Attorney, Agent, or Firm* — Tope-McKay & Associates

(57) ABSTRACT

Described is a system for session workflow information flow analysis. The system labels a session identification (ID) in a session workflow as high confidentiality, such that the session ID remains only in confidential channels. Non-owner channels and authorization server channels are labeled as public channels. The session ID is type checked with a security type system, and security of the session ID is verified.

12 Claims, 3 Drawing Sheets

(56) References Cited

OTHER PUBLICATIONS

Naoki Kobayashi, Benjamin C. Pierce, and David N. Turner. Linearity and the pi-calculus. In Hans-Juergen Boehm and Guy L. Steele, Jr., editors, POPL, pp. 358-371, ACM Press, 1996, ISBN 0-89791-769-3.

Jonathan Michaux, Elie Najm, and Alessandro Fantechi. Adding sessions to BPEL. In Josep Silva and Francesco Tiezzi, editors, WWV, vol. 98 of EPTCS, pp. 60-76, 2012.

Suhas Pai, Yash Sharma, Sunil Kumar, Radhika M Pai, and Sanjay Singh. Formal Verification of OAuth 2.0 using Alloy Framework. In Proceedings of the 2011 International Conference on Communication Systems and Network Technologies, Jun. 2011, pp. 655-659.

Milner, Robin. Communicating and Mobile Systems: The $\pi$-calculus. Cambridge, UK: Cambridge University Press. ISBN 0-521-65869-1, 1999, pages—the entire book.

Andrei Sabelfeld and Andrew C. Myers, "Language-Based Information-Flow Security", IEEE Journal on Selected Areas in Communication, vol. 21, No. 1, Jan. 2003.

\* cited by examiner

METHOD FOR SESSION WORKFLOW INFORMATION FLOW ANALYSIS

CROSS-REFERENCE TO RELATED APPLICATIONS

This is a Non-Provisional patent application of Ser. No. 62/403,811, filed in the United States on Oct. 4, 2016, entitled, "A Method for Session Workflow Information Flow Analysis," the entirety of which is hereby incorporated by reference.

BACKGROUND OF INVENTION

(1) Field of Invention

The present invention relates to a system for session workflow information flow analysis and, more particularly, to a system for session workflow information flow analysis using a static analysis technique.

(2) Description of Related Art

A workflow is comprised of an orchestrated and repeatable pattern of business activity that is enabled by the organization of resources into process that transform materials, provide services, and process information. Authorization in highly interconnected and interdependent systems poses a unique set of challenges. Modem systems utilize "API (application programming interface) access delegation" techniques (or sometimes considered more as an architectural style or best practice), such as OAuth (see the List of Incorporated Literature References, Literature Reference No. 2), to enable third party applications to obtain limited access to data and functionality provided by a software service. Such techniques have been shown to be suspect to session fixation attacks where the attacker initiates an authorization workflow only to trick the victim into completing the authentication step for a session with a session identifier (ID) known by the attacker.

A session identifier, or session 1D, is data that is used in network communications (e.g., over hypertext transfer protocol (HTTP)) to identify a session, which is a series of related message exchanges. The typical workarounds for session fixation and similar session ID attacks include timing out session IDs, regenerating session IDs on every request, and enforcing logout semantics.

The key problem is the reliance on session IDs to maintain the notion of state in an otherwise stateless application protocol (e.g., HTTP). In one sense, session IDs were originally intended to improve security by enabling applications to keep sensitive information only on the server instead of having the client and server exchange that information, leaving only the intrinsically uninteresting session ID to float over the wire. Unfortunately, session IDs are communicated in requests through cookies or the uniform resource locator (URL), both of which may be vulnerable to third party disclosure.

Session IDs are only as secure as they are secret. If a victim emails a URL with an embedded session ID to another person then she has compromised that session. If the session ID is sent in the clear and an attacker sniffs out the session ID that also compromises the session. Most solutions to securing session workflows are either ad hoc or brute force. The solutions rely a great deal on developers to carry out best practices and failing that, pervasive encryption. None of these techniques are fool-proof. Best practices cannot address complex interleaving and communication patterns. Encryption is only effective in the case where the attacker has not fixated sessions.

Thus, a continuing need exists for a system that uses a static technique for enforcing the security of session-based workflows with explicit support for modeling session IDs and attacker processes.

SUMMARY OF THE INVENTION

The present invention relates to a system for session workflow information flow analysis and, more particularly, to a system for session workflow information flow analysis using a static analysis technique. The system comprises one or more processors and a memory having instructions such that when the instructions are executed, the one or more processors perform multiple operations. The system labels a session identification (ID) in a session workflow as high confidentiality, such that the session ID remains only in confidential channels. Non-owner channels and authorization server channels are labeled as public channels. The session ID is type checked with a security type system, and security of the session ID is verified.

In another aspect, the session workflow is codified in formal semantics of a computer programming language.

In another aspect, the security type system ensures that the session ID will not directly or indirectly leak to an attacker.

In another aspect, the session ID can appear in an attacker system provided that it remains only in confidential channels, wherein the confidential channels cannot be directly or indirectly observed by an attacker.

In another aspect, the present invention also comprises a method for causing a processor to perform the operations described herein and performing the listed operations.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
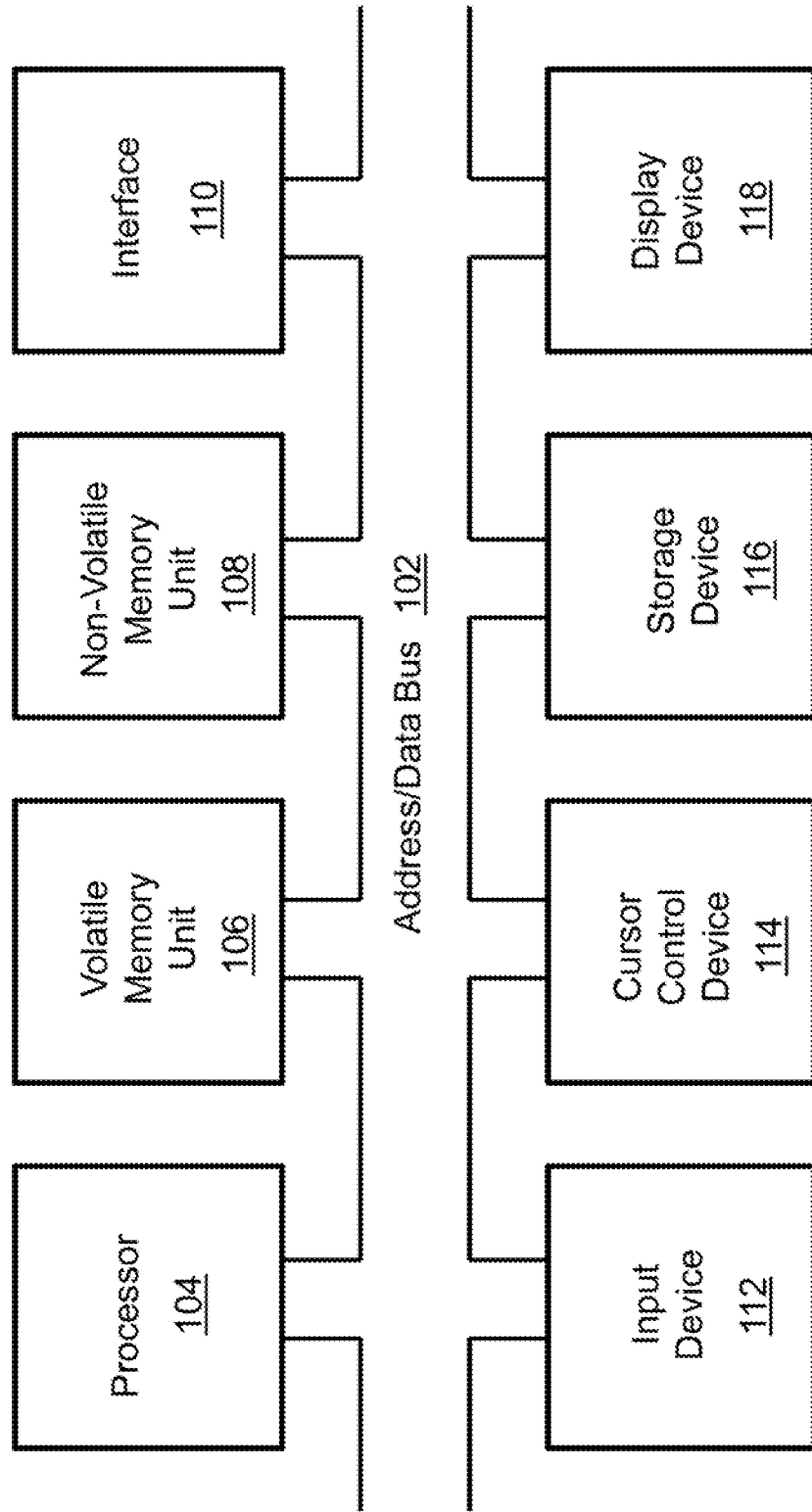
FIG. 1 is a block diagram depicting the components of a system for session workflow information flow analysis according to the principles of the present disclosure.

The present invention relates to a system for session workflow information flow analysis and, more particularly, to a system for session workflow information flow analysis using a static analysis technique. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) LIST OF INCORPORATED LITERATURE REFERENCES

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. Chetan Bansal, Karthikeyan Bhargavan, and Sergio Maffeis. Discovering concrete attacks on website authorization by formal analysis. In 2012 IEEE 25th Computer Security Foundations Symposium (CSF), June 2012.
2. D. Hardt. The OAuth 2.0 authorization framework draft-ietf-oauth-v2-31. Technical report, July 2012. http://tools.ietf.org/html/draft-ietf-oauth-v2-31, taken on Aug. 4, 2014.
3. Naoki Kobayashi. Type-based information flow analysis for the pi-calculus. Acta Inf., 42(4-5): 291-347, 2005.
4. Naoki Kobayashi, Benjamin C. Pierce, and David N. Turner. Linearity and the pi-calculus. In Hans-Juergen Boehm and Guy L. Steele, Jr., editors, POPL, pages 358-371, ACM Press, 1996, ISBN 0-89791-769-3.
5. Jonathan Michaux, Elie Najm, and Alessandro Fantechi. Adding sessions to BPEL. In Josep Silva and Francesco Tiezzi, editors, WW, volume 98 of EPTCS, pages 60-76, 2012.
6. Suhas Pai, Yash Sharma, Sunil Kumar, Radhika M Pai, and Sanjay Singh. Formal Verification of OAuth 2.0 using Alloy Framework. In Proceedings of the 2011 International Conference on Communication Systems and Network Technologies, June 2011.
7. Milner, Robin. Communicating and Mobile Systems: The x-calculus. Cambridge, UK: Cambridge University Press. ISBN 0-521-65869-1, 1999.

(2) PRINCIPAL ASPECTS

The present invention has three "principal" aspects. The first is a system for session workflow information flow analysis. The system is typically in the form of a computer system operating software or in the form of a "hard-coded" instruction set. This system may be incorporated into a wide variety of devices that provide different functionalities, such as a robot or other device. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment.

Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
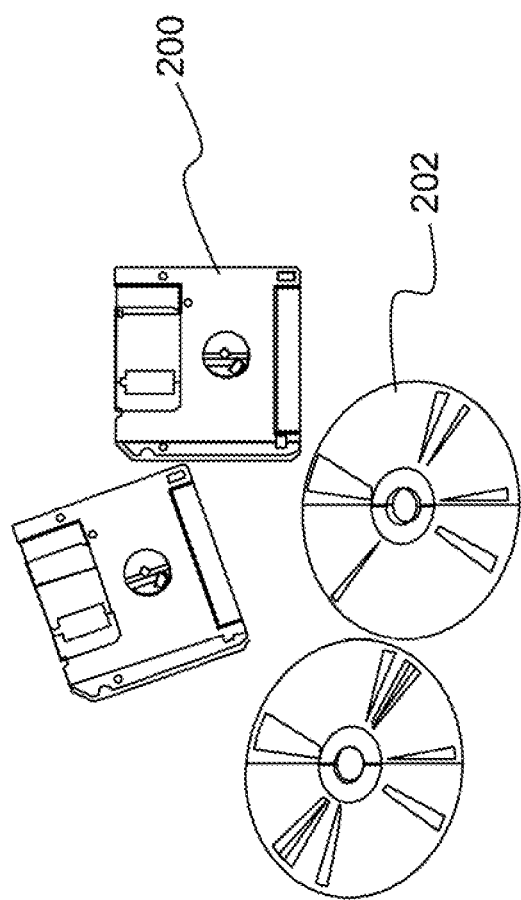
FIG. 2 is an illustration of a computer program product according to the principles of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF THE INVENTION (3.1) Session Authorization Workflows

Authorization in highly interconnected and interdependent systems poses a unique set of challenges. Modern systems utilize "API (application programming interface) access delegation" techniques (or sometimes considered more as an architectural style or best practice), such as OAuth (see Literature Reference No. 2), to enable third party applications to obtain limited access to data and functionality provided by a software service. Such techniques have been shown to be subject to session fixation attacks, where the attacker initiates an authorization workflow only to trick the victim into completing the authentication step for a session with a session identifier (D) known by the attacker.

The key problem is the reliance on session IDs to maintain the notion of state in an otherwise stateless application protocol (e.g., hyper-text transfer protocol (HTTP)). In one sense, session IDs were originally intended to improve security by enabling applications to keep sensitive information only on the server instead of having the client and server exchange that information, leaving only the intrinsically uninteresting session ID to float over the wire. Unfortunately, session IDs are communicated in requests through cookies or the uniform resource locator (URL), both of which may be vulnerable to third party disclosure.

Session IDs are only as secure as they are secret. If a victim emails a URL with an embedded session ID to another person, then he or she has compromised that session. If the session ID is sent in the clear and an attacker ascertains the session ID, which also compromises the session.

(3.1.1) Session Authorization

The challenge from the system designer's point-of-view is the need to ensure that sessions and associated session IDs do not persist beyond their usefulness and do not become disassociated with the owner of the session. A representative example of a desired lifecycle of a session can be summarized as follows:

1. Initiate authentication.
2. Check credentials.
3. Issue session ID and create session.
4. Destroy session after a timeout, logout, or completion of an authorized action.

The above session lifecycle denotes a kind of session workflow. Each session can terminate via time-out, logout, or completion of an authorized action. These session lifecycle steps can be further chained to obtain richer behaviors. For example, consider the following two scenarios:

1. After a time-out, the program can generate a new authentication request.
2. After the completion of a task, the program can generate a new session ID to support a subsequent request.

The system according to the principles of the present disclosure codifies the session lifecycle in a formal semantics that enables automatic checking of the security of session management functionality in programs (e.g., any program that uses session ids, such as a program implementing a web service). The formal semantics provides a formal definition of what the session lifecycle should be. Formal semantics of a programming language is the mathematical definition of the meaning of all the programming language constructs.

(3.1.2) Third Party Application Programming Interface (API) Authorization

The OAuth protocol (see Literature Reference No. 2) use case describes the interaction of four parties including a resource server that stores private data; an authorization server which issues an access token (an access token contains the security credentials for a login session and identifies the user, the user's groups, the user's privileges, and, in some cases, a particular application); a resource owner that has login credentials for the private data on the resource server; and a client that needs to have limited access to the private data on the resource server to perform an action on behalf of the resource owner. Using Facebook™ authentication to log into an unrelated website is a non-limiting example utilizing a protocol similar to OAuth 2.0. In this example, the client is a user with an internet browser, the resource server is any web server that wants to authenticate the user, and Facebook™ is the authentication server. The OAuth 2.0 draft standard described in Literature Reference No. 2 enumerates four forms of access grants: authorization code; implicit; resource owner password credentials; and client credentials.

(3.1.3) Process Calculus Representation

The stateless protocol for modeling the session lifecycle can be represented as an applied typed $\pi$-calculus, a process calculus (i.e., a fundamental language for representing concurrent computations such as in the case with client/server communications). The $\pi$-calculus is considered a fundamental proto-language for the message-passing model of concurrency, thus capable of modeling distributed computing, network computing, and host-based concurrency. $\pi$-calculus is described in Literature Reference No. 7.

Kobayashi developed a security-typed variant of the $\pi$-calculus (see Literature Reference No. 3) where the calculus admitted syntax-directed type inference. The work built upon prior attempts at devising an information analysis for a process calculi primarily by relaxing the restrictions on communication patterns. Early attempts made draconian restrictions on what a process could do subsequent to receiving on a secret channel.

For the purposes of this disclosure, a channel is any communication channel used by the program to communicate with outside entities. As a non-limiting example, in the case of a web service, any HTTP connection would be a communication channel.

The process syntax is defined as follows:

$$P::=0\,|\,\bar{x}\langle v_1, \ldots, v_n\rangle P\,|\,x(y_1, \ldots, y_n)\cdot P\,|\,(P|Q)\,|\,*P\,|\,(vx:\xi)P$$

Above is a standard form for defining grammar of programming languages denoting that process (P) can take any of the forms described below. It is a simplified form of "Definition 2" described in detail in Literature Reference No. 3.

The 0 is the null process which serves as a terminator for an enclosing process. The $\bar{x}\langle v_1, \ldots, v_n\rangle\cdot P$ is an n-ary output prefix denoting a process that outputs n-ary tuple $y_1, \ldots, y_n$ over the channel x and then executes P. Similarly, the input prefix $x(y_1, \ldots, y_n)\cdot P$ denotes a process that receives an n-ary tuple $y_1, \ldots, y_n$ over the channel x and then executes P. The parallel construct (P|Q) executes the two processes concurrently. The replication process *P makes an arbitrary number of copies of the process P and executes them concurrently. The new process $(vx:\xi)P$ generates a fresh channel name x with the expectation that the type of values communicated over it must be of channel type $\xi$. Channel types are types labeled with a security level (e.g., $int^H$).

A sequence of input and output prefixes in the calculus corresponds to the notion of a request. Typically, a client initiates a request, a server receives it and responds with the results, and the client receives the response. This sequence of events defines a request. The session workflows can be encoded as programs in this calculus.

Session IDs are generated by authenticated workflows. This behavior can be modeled as a primitive authenticate. On the client side, a primitive receiveID can be a channel for an input prefix that receives a fresh session ID. Enforcing session IDs with limited lifetime based on the completion of an authorized action requires scoping of that action. In such a case, session IDs can be considered a lexically scoped block variable that is deallocated upon reaching the end of the lexical block.

The problem of securing the session ID has garnered considerable attention from many facets of industry and academia. There are a number of approaches to remediating the deficiencies of session management, but none of the existing solutions are perfect. With respect to the need for preventing session ID disclosure through third party sniffing for session IDs being passed in the clear, encryption at the transport layer goes quite a way toward addressing that need. Unfortunately, such an approach does not address session fixation vulnerabilities or host-based attacks. Association of sessions with a single, fixed Internet protocol (IP) address is impractical due to the prevalence of network address translation (NAT) in Internet systems. Furthermore, modern applications have begun to move away from the conventional request/response model of communication to a more fluid asynchronous model.

(3.2) A Language and Semantics for Session Workflows

Let s, c, $\gamma$, i, query and response denote the server channel, client channel, client credential, and session ID, client query, and server response, respectively. A non-limiting example of a typical session workflow from the perspective of the client, represented in Kobayashi's applied variant of the polyadic π-calculus, is as follows:

$$\bar{s}\langle \gamma \rangle \cdot s(i) \cdot \bar{s}\langle i, \text{query} \rangle \cdot s(\text{response}).$$

From the server, the exchange is slightly more involved due to the logic for checking the credentials and creating the new session and is as follows:

$$c(\gamma) \cdot \text{if valid}(\gamma) \text{then}(v_i : \text{int}^H) \bar{c} \langle i \rangle \cdot c(i', \text{query}) \cdot \text{if } i = i' \text{then}$$
$$\bar{c} \langle \text{response} \rangle \cdot 0 \text{ else } 0 \text{ else } 0,$$

where valid(γ) denotes the server's check for the validity of the client credentials.

The above server program takes no special care to manage the lifetime of the session ID. Instead, the session ID naturally expires according to the scope of the v operator (that is, the fresh name-binding operator of the w-calculus (see Literature Reference No. 7 for a description of the fresh name-binding operator)). Unfortunately, this property is not sufficient to ensure that the lifetime of the session ID is correct. The problem is more apparent if the client, server, and a third process are composed using the parallel-operator (see Literature Reference No. 7). According to the semantics of the π-calculus, P|(Q|R)≡(P|Q)R (defined in Literature Reference No. 7), hence the expected semantics cannot depend on a particular interleaving of the three processes. In particular, if the third process also expects to receive the session ID from the server on channel s, then it could hijack the session.

Let c' be the attacker's channel to the client, respectively. Let a be the server's channel to the attacker. Various forms of attacks on the session workflow can be expressed in the applied π-calculus as follows:

$$\bar{s}\langle\ \rangle \cdot s(i) \cdot \bar{c}'\langle i \rangle \cdot P.$$

where P is the reminder of the attack process.

The above sequence is the attacker's process. It begins by initiating a session with the server by sending an empty message (which can be understood as a GET request (i.e., a request for data from a specified resource). The attacker receives a response with the session ID i for his new session. The attacker now redirects the victim to authenticate that session to the victim's own credentials. When the attacker reaches P, he has full control of an authenticated session with session ID i according to the following:

$$a(i) \cdot \bar{s}\langle i, \gamma \rangle \cdot 0.$$

By authenticating session i with the victim's own credentials, the victim has handed the attacker a session where the attacker is free to do anything with the victim's identity and privileges for the duration of that one session. In this representation, the client receives the session ID and authenticates session i using real credentials. In practice, the step connecting the receipt of the fixed session ID from the attacker and authenticating is mediated by some innocuous-looking front for the attacker. In particular, if the attacker can get the victim onto a webpage controlled by the attacker, then this redirection is simple. The generation of the session ID is, as usual, handled by the server. In the process calculus, this can be modeled with the v-operator, which generates fresh names.

There are two ways to view the session ID security problem. The resource server, owner, and potential client would like to keep the session ID confidential from an attacker. Alternatively, the resource server can treat session IDs as high or low integrity depending on the source.

(3.3) Session ID Security as an Information Flow Property

The critical property in session management is that a non-owner will not be able to gain access to an active session ID. The session ID in this case can be considered a confidential variable in a process calculus representation of the session management protocol. All attacker channels are considered public (i.e., the opposite of confidential). Thus, the session ID security question can be reframed as an information flow noninterference one where it is required that the confidential session ID never falls into a public channel. In terms of information flow, this means the value of the session ID should never interfere or make a difference to the result of public results from attacker computations. Notice that this property is more precise than prohibiting the session ID from leaking out, as is prevented by transport-layer encryption. This property permits the session ID to appear in the attacker system as long as it remains only in confidential channels which cannot be directly or indirectly observed by the attacker. This concept is a natural match for the third party authorization problem where a third party, the client, must have access to a session ID, but not in a way that it can be further disclosed or abused.

Figure 3:
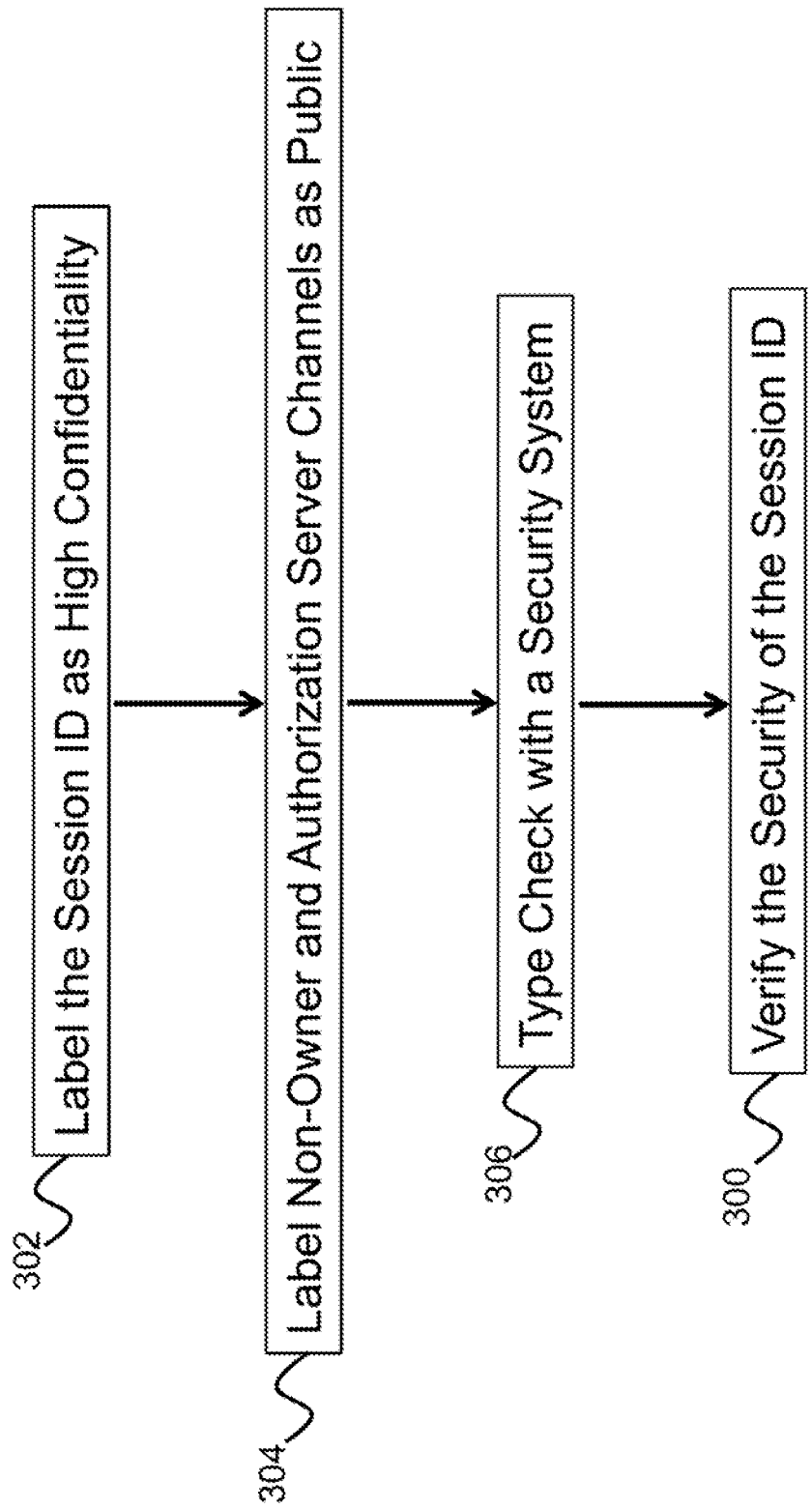
FIG. 3 illustrates a system for session workflow information flow analysis according to the principles of the present disclosure.

As illustrated in FIG. 3, the main steps for verifying the security of the session ID 300 include:
1. Label the session ID as high confidentiality 302.
2. Label non-owner and authorization server channels as public 304. A non-owner channel is any channel used to communicated with entities other than the session over. An authorization server channel is a channel used to communicate with the authorization channel. Assigning a label means that the analysis process associates the label with the channel (e.g., by maintaining a lookup table of all associations established so far). An authorization server should not be provided with a session id; only the user should get it.
3. Type check with a security type system 306.

Steps 1 (element 302) and 2 (element 304) above are essentially preparation steps for analysis, and step 3 (element 306) is the main analysis step.

(3.4) Type System

To protect the confidentiality of the session 1, a security type system is used. The type system enables step 3 above. In the security type system, the main high value would be the session ID. The public (i.e., low confidentiality) channels include all channels except for those involved in authentication and authorization, principally the resource owner and authorization server channels. The type checker traverses the program to ensure that the session ID will not directly or indirectly (via control flow) leak to the attacker or any third party observing the client, resource owner, and other actors (or parties). Below is a non-limiting example of a simple, restrictive version of a security type system for the π-calculus following and simplifying the Kobayashi type system (see Literature Reference No. 3).

$$\ell ::= \xi | L | H$$

$$\phi; pc \vdash 0$$

$$\frac{\Gamma; pc \vdash P}{\Gamma; pc \vdash *P}$$

$$\frac{\Gamma[x \mapsto \xi]; pc \vdash P}{\Gamma; pc \vdash (vx:\xi)P}$$

-continued $$\frac{\Gamma_1; pc \vdash P_1 \quad \Gamma_2; pc \vdash P_2}{\Gamma_1|\Gamma_2; pc \vdash P_1|P_2}$$

$$\frac{\Gamma[x \mapsto \langle\tau\rangle^{l_1}][y \leftrightarrow \tau]; l_2 \vdash P \quad pc \sqsubseteq l_1 \sqsubseteq l_2}{\Gamma[x \mapsto \langle\tau\rangle^{l_1}]; pc \vdash x(y).P}$$

$$\frac{\Gamma[x \mapsto \langle\tau\rangle^{l_1}]; l_2 \vdash P}{\Gamma; pc \vdash \overline{x}\langle v\rangle.P}$$

In the above type system, the judgments are of the form $\Gamma;pc \vdash P$, where $\Gamma$ is the type environment, pc is the program context security level (i.e., the security level of the control), and P is the π-calculus process to be checked. The type environment is a sequence of bindings of the form $[x \mapsto r]$, where x is the channel name (string) and r is the corresponding channel type. The 0 rule type checks the 0 process under all type environments. The *P rule recursively type checks the replicated process P under the same type environment context and program context pc. The type checking rule for the scope restriction operator $(vx:\xi)P$ adds a fresh variable to the environment.

The process of managing the state of a web-based client is through the use of session IDs. Session IDs are used by the application to uniquely identify a client browser, while background (server-side) processes are used to associate the session ID with a level of access. Session IDs are often used to identify a user that has logged into a website, they can be used by an adversary to hijack the session and obtain potential privileges.

The invention described herein can be utilized in many client-server applications, both customer- and internal-facing applications, which rely on session management to maintain identities in workflows. For example, a company's internal and customer solutions may include organizational management capabilities which require session-enabled identification and authentication for nearly all workflows. The system described herein can be used to prevent adversaries from gaining access to certain private levels of a website, thus maintaining security of the website.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for session workflow information flow analysis, the system comprising:
one or more processors and a non-transitory computer-readable medium having executable instructions encoded thereon such that when executed, the one or more processors perform operations of:
verifying security of a session identification (ID), comprising:
assigning a label to the session ID in a session workflow according to a level of high confidentiality, such that the session ID remains only in confidential channels, wherein the session ID is a confidential variable in a process calculus representation of a session management protocol;
assigning labels to non-owner channels and authorization server channels according to a level of low confidentiality, such that the non-owner channels and authorization server channels are labeled as public channels; and
type checking the session ID with a type system for information flow analysis; and
protecting confidentiality of the session ID using the type system for information flow analysis.

2. The system as set forth in claim 1, wherein the one or more processors further perform an operation of codifying a session lifecycle in a formal semantics that enables automatic checking of session management functionality in any program that uses the session ID, wherein the formal semantics is a mathematical definition of programming language constructs.

3. The system as set forth in claim 2, wherein a type checker ensures that the session ID will not directly or indirectly leak to an attacker.

4. The system as set forth in claim 1, wherein the session ID can appear in an attacker system provided that it remains only in confidential channels, wherein the confidential channels cannot be directly or indirectly observed by an attacker.

5. A computer-implemented method for session workflow information flow analysis, the computer-implemented method using one or more processors to perform operations of:
verifying security of a session identification (ID), comprising:
assigning a label to the session ID in a session workflow according to a level of high confidentiality, such that the session ID remains only in confidential channels, wherein the session ID is a confidential variable in a process calculus representation of a session management protocol;
assigning labels to non-owner channels and authorization server channels according to a level of low confidentiality, such that the non-owner channels and authorization server channels are labeled as public channels; and
type checking the session ID with a type system for information flow analysis; and
protecting confidentiality of the session ID using the type system for information flow analysis.

6. The method as set forth in claim 5, wherein the one or more processors further perform an operation of codifying a session lifecycle in a formal semantics that enables automatic checking of session management functionality in any program that uses the session ID, wherein the formal semantics is a mathematical definition of programming language constructs.

7. The method as set forth in claim 6, wherein a type checker ensures that the session ID will not directly or indirectly leak to an attacker.

8. The method as set forth in claim 5, wherein the session ID can appear in an attacker system provided that it remains only in confidential channels, wherein the confidential channels cannot be directly or indirectly observed by an attacker.

9. A non-transitory computer readable medium for session workflow information analysis, having stored thereon, computer-readable instructions that when executed by a processor, cause the processor to perform operations comprising:

verifying security of a session identification (ID), comprising:

assigning a label to the session ID in a session workflow according to a level of high confidentiality, such that the session ID remains only in confidential channels, wherein the session ID is a confidential variable in a process calculus representation of a session management protocol;

assigning labels to non-owner channels and authorization server channels according to a level of low confidentiality, such that the non-owner channels and authorization server channels are labeled as public channels; and type checking the session ID with a type system for information flow analysis; and protecting confidentiality of the session ID using the type system for information flow analysis.

10. The computer program product as set forth in claim 9, further comprising computer readable instructions to cause the processor to codify a session lifecycle in a formal semantics that enables automatic checking of session management functionality in any program that uses the session ID, wherein the formal semantics is a mathematical definition of programming language constructs.

11. The computer program product as set forth in claim 10, further comprising computer readable instructions to cause a type checker to ensure that the session ID will not directly or indirectly leak to an attacker.

12. The computer program product as set forth in claim 9, wherein the session ID can appear in an attacker system provided that it remains only in confidential channels, wherein the confidential channels cannot be directly or indirectly observed by an attacker.

\* \* \* \* \*